(12) United States Patent  
Xiao et al.

(10) Patent No.: US 11,334,707 B2  
(45) Date of Patent: May 17, 2022

(54) METHOD AND AN APPARATUS FOR DISPLAYING INFORMATION FLOW, A STORAGE, AN ELECTRONIC DEVICE

(71) Applicant: BEIJING BYTEDANCE NETWORK TECHNOLOGY CO., LTD., Beijing (CN)

(72) Inventors: Shenke Xiao, Beijing (CN); Pingzhong Tang, Beijing (CN); Lihua Zhang, Beijing (CN); Xiwang Yang, Beijing (CN); Changsheng Gu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/979,690

(22) PCT Filed: Nov. 14, 2018

(86) PCT No.: PCT/CN2018/115465  
§ 371 (c)(1),  
(2) Date: Sep. 10, 2020

(87) PCT Pub. No.: WO2020/097832  
PCT Pub. Date: May 22, 2020

(65) Prior Publication Data  
US 2021/0049317 A1 Feb. 18, 2021

(51) Int. Cl.  
*G06F 3/0485* (2022.01)  
*G06F 40/106* (2020.01)  
(Continued)

(52) U.S. Cl.  
CPC .............. *G06F 40/106* (2020.01); *G06F 3/14* (2013.01); *G06F 40/117* (2020.01); *G06N 20/00* (2019.01); *G06Q 50/01* (2013.01)

(58) Field of Classification Search  
CPC ........ G06F 40/106; G06F 40/117; G06F 3/14; G06F 3/048; G06N 20/00; G06Q 50/01; G06Q 30/02  
See application file for complete search history.

(56) References Cited

U.S. PATENT DOCUMENTS 8,578,407 B1 * 11/2013 Redol ................ G06Q 30/0241  
                                                                                  725/32  
2002/0032696 A1 * 3/2002 Takiguchi ............. G06F 16/168  
                                                                                 715/255

(Continued)

FOREIGN PATENT DOCUMENTS

| CN | 105139233 A | 12/2015 |
|---|---|---|
| CN | 106384254 A | 2/2017 |

(Continued)

OTHER PUBLICATIONS

International Patent Application No. PCT/CN2018/115465; Int'l Search Report; dated Aug. 21, 2019; 2 pages.

*Primary Examiner* — Hassan Mrabi  
(74) *Attorney, Agent, or Firm* — BakerHostetler (57) ABSTRACT

A method and an apparatus for displaying information flow, a storage medium and an electronic device are provided. The method includes: dividing a predetermined display time period for the first-type display information into multiple sub-time periods; determining, for the sub-time periods, a segmented display target of each piece of first-type display information in the sub-period based on a display target of the first-type display information in the predetermined display time period; and determining, for each display position, target display information to be allocated to the display position from the information flow, based on an estimated click-through rate of the display position, a proposed value of the second-type display information, historical display data of the first-type display information, and a segmented (Continued)

display target of the first-type display information in a current sub-time period.

13 Claims, 4 Drawing Sheets (51) Int. Cl.
*G06N 20/00* (2019.01)
*G06F 40/117* (2020.01)
*G06F 3/14* (2006.01)
*G06Q 50/00* (2012.01)

(56) References Cited

U.S. PATENT DOCUMENTS

| | | | |
|---|---|---|---|
| 2016/0170629 A1* | 6/2016 | Gabryjelski | G06F 3/04842 715/786 |
| 2016/0353166 A1* | 12/2016 | Arsenault | G06Q 30/0201 |
| 2017/0139555 A1* | 5/2017 | Gao | G06F 3/04842 |
| 2017/0213243 A1* | 7/2017 | Dollard | G06Q 30/0249 |
| 2020/0034892 A1* | 1/2020 | Huang | G06F 16/958 |

FOREIGN PATENT DOCUMENTS

| | | |
|---|---|---|
| CN | 107749001 A | 3/2018 |
| CN | 108121738 A | 6/2018 |
| CN | 108337278 A | 7/2018 |

* cited by examiner

METHOD AND AN APPARATUS FOR DISPLAYING INFORMATION FLOW, A STORAGE, AN ELECTRONIC DEVICE

The present application is a National Stage application of PCT international patent application No. PCT/CN2018/115465 filed on Nov. 14, 2018, the entire of which is incorporated herein by reference.

TECHNICAL FIELD

The present disclosure relates to the technical field of internet, and in particular to a method and an apparatus for displaying information flow, a storage medium and an electronic device.

BACKGROUND

Information flow is one of the most important innovations in social media mobile applications, that is, multiple pieces of information will be displayed when a user loads a display interface. The information flow may include two types of display information. Each piece of first-type display information is displayed according to an agreement (such as, a predetermined display number and a predetermined display time period). Each piece of second-type display information has a proposed value, and a value can be obtained by displaying the second-type display information. Therefore, each piece of second-type display information is usually displayed according to the proposed value of the piece of second-type display information, that is, a higher proposed value indicates a higher display priority of the piece of second-type display information.

During the display of the information flow, for each display position, if the display position is allocated to display a piece of second-type display information, the agreement according to which the first-type display information is displayed may not be satisfied, and a click-through rate of the first-type display information may be affected. If the display position is allocated to display a piece of first-type display information, the value obtained by displaying a piece of second-type display information will be lost. Therefore, for each display position, it is a difficult problem how to determine target display information to be allocated to the display position to satisfy the agreement according to which first-type display information is displayed, ensure the click-through rate of the first-type display information, and reduce the value loss.

SUMMARY

According to the present disclosure, a method and an apparatus for displaying information flow, a storage medium and an electronic device are provided to satisfy an agreement according to which first-type display information is displayed, ensure a click-through rate of the first-type display information, and reduce a value loss.

According to a first aspect of the present disclosure, a method for displaying information flow is provided. The information flow includes multiple pieces of first-type display information and multiple pieces of second-type display information. The method includes:

dividing a predetermined display time period for the multiple pieces of first-type display information into multiple sub-time periods;

determining, for each of the multiple sub-time periods, a segmented display target of each of the multiple pieces of first-type display information in the sub-time period based on a display target of the piece of first-type display information in the predetermined display time period; and determining, for each display position, target display information to be allocated to the display position from the information flow, based on an estimated click-through rate of the display position, a proposed value of each of the multiple pieces of second-type display information, historical display data of each of the multiple pieces of first-type display information, and a segmented display target of each of the multiple pieces of first-type display information in a current sub-time period.

In an embodiment, the display target includes a predetermined display number of each of the multiple pieces of first-type display information, and the segmented display target includes a target display number of each of the multiple pieces of first-type display information in each of the multiple sub-time periods. The determining, for each of the multiple sub-time periods, a segmented display target of each of the multiple pieces of first-type display information in the sub-time period based on a display target of the piece of first-type display information in the predetermined display time period includes:

obtaining, for each of the multiple sub-time periods, a cumulative display number and a cumulative click-through number of each of the multiple pieces of first-type display information at a starting time instant of the sub-time period, inputting the starting time instant, the cumulative display number and the cumulative click-through number of each of the multiple pieces of first-type display information at the starting time instant as state information into a segment target determination model, to obtain a total return which is outputted from the segment target determination model and corresponds to the state information, where the segment target determination model is obtained by performing reinforcement learning based on historical state information of multiple pieces of first-type display information at the starting time instant and total returns corresponding to the historical state information, determining a target conversion rate of each of the multiple pieces of first-type display information in the sub-time period based on the total return corresponding to the state information, and determining, for each of the multiple pieces of first-type display information, a target display number of the piece of first-type display information in the sub-time period based on a predetermined display number of the piece of first-type display information in the predetermined display time period and the target conversion rate of the piece of first-type display information in the sub-time period.

In an embodiment, the segmented display target includes a target display number of each of the multiple pieces of first-type display information in each of the multiple sub-time periods, and the historical display data includes a cumulative display number and an actual value of each of the multiple pieces of first-type display information. The determining, for each display position, target display information to be allocated to the display position from the information flow, based on an estimated click-through rate of the display position, a proposed value of each of the multiple pieces of second-type display information, historical display data of each of the multiple pieces of first-type display information, and a segmented display target of each of the multiple pieces of first-type display information in a current sub-time period includes:

determining, for each display position, a current click-through rate threshold of each of the multiple pieces of first-type display information based on a cumulative display number of the piece of first-type display information, a predetermined display number of the piece of first-type display information, and a target display number of the piece of first-type display information in a current sub-time period, determining a current proposed value of the piece of first-type display information based on a maximum proposed value of the piece of first-type display information, an actual value of the piece of first-type display information, the predetermined display number of the piece of first-type display information, and the target display number of the piece of first-type display information in the current sub-time period, and filtering out first-type display information having a current click-through rate threshold greater than the estimated click-through rate of the display position from the multiple pieces of first-type display information, and selecting a piece of display information having a highest current proposed value from remaining pieces of first-type display information and the multiple pieces of second-type display information as the target display information.

In an embodiment, the determining, for each display position, a current click-through rate threshold of each of the multiple pieces of first-type display information based on a cumulative display number of the piece of first-type display information, a predetermined display number of the piece of first-type display information, and a target display number of the piece of first-type display information in a current sub-time period includes:

dividing, for each display position, the current sub-time period equally into u sub-time intervals, and determining, for each of the multiple pieces of first-type display information, a click-through rate threshold of the piece of first-type display information in each of u sub-time intervals by using following equations, and using a click-through rate threshold of the piece of first-type display information in the current sub-time interval as the current click-through rate threshold of the piece of first-type display information:

$$P_i^{ctr} \leftarrow \frac{n_i r(t_j^l) + \varepsilon_{ctr}}{n_i'(t_j^l) + \varepsilon_{ctr}}$$

$$I_i^{ctr} \leftarrow \mathrm{clamp}\,(I_i^{ctr} P_i^{ctr})$$

$$C_i^{ctr} \leftarrow P_i^{ctr} (I_i^{ctr})^{u_{ctr}}$$

$$\theta_i \leftarrow ppf(1 - C_i^{ctr}(1 - cdf(\theta_i^{init})))$$

where, $\theta_i$ represents a current click-through rate threshold of an i-th piece of first-type display information $g_i$, and where i=1, 2, . . . , m, $\theta_i^{init}$ represents a preset initial click-through rate threshold of the piece of first-type display information $g_i$, $P_i^{ctr}$ and $I_i^{ctr}$ respectively represent a proportional parameter and an integral parameter based on which a PID adjustment is performed on a click-through rate threshold of the piece of first-type display information $g_i$, $C_i^{ctr}$ represents a product of a weighted $P_i^{ctr}$ multiplied with a weighted $I_i^{ctr}$, $n_i$ represents a predetermined display number of the piece of first-type display information $g_i$, $n_i'(t_j^l)$ represents a cumulative display number of the piece of first-type display information $g_i$ at a time instant $t_j^l$, $r(t_j^l)$ represents a target conversion rate of the piece of first-type display information $g_i$ at a time instant $t_j^l$, cdf( ) represents a click-through rate cumulative distribution function, clamp (x)=min {max{x, $10^{-6}$}, $10^6$}, ppf( ) represents a click-through rate percentage function, and $\varepsilon_{ctr}$ and $u^{ctr}$ represent preset constants.

In an embodiment, the determining a current proposed value of the piece of first-type display information based on a maximum proposed value of the piece of first-type display information, an actual value of the piece of first-type display information, the predetermined display number of the piece of first-type display information, and the target display number of the piece of first-type display information in the current sub-time period includes:

dividing, for each display position, the current sub-time period equally into u sub-time intervals, and determining, for each of the multiple pieces of first-type display information, a proposed value of the piece of first-type display information in each of u sub-time intervals by using following equations, and using a proposed value of the piece of first-type display information in the current sub-time interval as the current proposed value of the piece of first-type display information:

$$P_i^{bid} \leftarrow \frac{B_i r(t_j^l) + \varepsilon_{bid}}{B_i'(t_j^l) + \varepsilon_{bid}}$$

$$I_i^{bid} \leftarrow \mathrm{clamp}\,(I_i^{bid} P_i^{bid})$$

$$C_i^{bid} \leftarrow P_i^{bid}(I_i^{bid})^{u_{bid}}$$

$$b_i \leftarrow C_i^{bid} b_i^{init}$$

where, $b_i$ represents a current proposed value of an i-th piece of first-type display information $g_i$, and where i=1, 2, . . . , m, $b_i^{init}$ represents a preset initial proposed value of the piece of first-type display information $g_i$, $P_i^{bid}$ and $I_i^{bid}$ respectively represent a proportional parameter and an integral parameter based on which a PID adjustment is performed on a proposed value of the piece of first-type display information $g_i$, $C_i^{bid}$ represents a product of a weighted $P_i^{bid}$ multiplied with a weighted $I_i^{bid}$, $B_i$ represents a maximum proposed value of the piece of first-type display information $g_i$, $B_i'(t_j^l)$ represents an actual value of the piece of first-type display information $g_i$ at a time instant $t_j^l$, $r(t_j^l)$ represents a target conversion rate of the piece of first-type display information $g_i$ at the time instant $t_j^l$, and $\varepsilon_{bid}$ and $u^{ctr}$ represent preset constants.

According to a second aspect of the present disclosure, an apparatus for displaying information flow is provided. The information flow includes multiple pieces of first-type display information and multiple pieces of second-type display information. The apparatus includes: a division module, a determination module, and an allocation module.

The division module is configured to divide a predetermined display time period for the multiple pieces of first-type display information into multiple sub-time periods.

The determination module is configured to determine, for each of the multiple sub-time periods, a segmented display target of each of the multiple pieces of first-type display information in the sub-time period based on a display target of the piece of first-type display information in the predetermined display time period.

The allocation module is configured to determine, for each display position, target display information to be allocated to the display position from the information flow, based on an estimated click-through rate of the display position, a proposed value of each of the multiple pieces of second-type display information, historical display data of each of the multiple pieces of first-type display information, and a segmented display target of each of the multiple pieces of first-type display information in a current sub-time period.

In an embodiment, the display target includes a predetermined display number of each of the multiple pieces of first-type display information, and the segmented display target includes a target display number of each of the multiple pieces of first-type display information in each of the multiple sub-time periods. The determination module includes: a first obtaining submodule, a second obtaining submodule, a first determination submodule, and a second determination submodule.

The first obtaining submodule is configured to obtain, for each of the multiple sub-time periods, a cumulative display number and a cumulative click-through number of each of the multiple pieces of first-type display information at a starting time instant of the sub-time period.

The second obtaining submodule is configured to input the starting time instant, the cumulative display number and the cumulative click-through number of each of the multiple pieces of first-type display information at the starting time instant as state information into a segment target determination model, to obtain a total return which is outputted from the segment target determination model and corresponds to the state information. The segment target determination model is obtained by performing reinforcement learning based on historical state information of multiple pieces of first-type display information at the starting time instant and total returns corresponding to the historical state information.

The first determination submodule is configured to determine a target conversion rate of each of the multiple pieces of first-type display information in the sub-time period based on the total return corresponding to the state information.

The second determination submodule is configured to determine, for each of the multiple pieces of first-type display information, a target display number of the piece of first-type display information in the sub-time period based on a predetermined display number of the piece of first-type display information in the predetermined display time period and the target conversion rate of the piece of first-type display information in the sub-time period.

In an embodiment, the segmented display target includes a target display number of each of the multiple pieces of first-type display information in each of the multiple sub-time periods, and the historical display data includes a cumulative display number and an actual value of each of the multiple pieces of first-type display information. The allocation module includes: a third determination submodule, a fourth determination submodule, and an allocation submodule.

The third determination submodule is configured to determine, for each display position, a current click-through rate threshold of each of the multiple pieces of first-type display information, based on a cumulative display number of the piece of first-type display information, a predetermined display number of the piece of first-type display information, and a target display number of the piece of first-type display information in a current sub-time period.

The fourth determination submodule is configured to determine, for each display position, a current proposed value of each of the multiple pieces of first-type display information, based on a maximum proposed value of the piece of first-type display information, an actual value of the piece of first-type display information, the predetermined display number of the piece of first-type display information, and the target display number of the piece of first-type display information in the current sub-time period.

The allocation submodule is configured to filter out first-type display information having a current click-through rate threshold greater than the estimated click-through rate of the display position from the multiple pieces of first-type display information, and select a piece of display information having a highest current proposed value from remaining pieces of first-type display information and the multiple pieces of second-type display information as the target display information.

In an embodiment, the third determination submodule is configured to:

divide, for each display position, the current sub-time period equally into u sub-time intervals, and determine, for each of the multiple pieces of first-type display information, a click-through rate threshold of the piece of first-type display information in each of u sub-time intervals by using following equations, and use a click-through rate threshold of the piece of first-type display information in a current sub-time interval as the current click-through rate threshold of the piece of first-type display information:

$$P_i^{ctr} \leftarrow \frac{n_i r(t_j^l) + \varepsilon_{ctr}}{n_i'(t_j^l) + \varepsilon_{ctr}}$$

$$I_i^{ctr} \leftarrow \text{clamp}\, (I_i^{ctr} P_i^{ctr})$$

$$C_i^{ctr} \leftarrow P_i^{ctr} (I_i^{ctr})^{u_{ctr}}$$

$$\theta_i \leftarrow ppf(1 - C_i^{ctr}(1 - cdf(\theta_i^{init})))$$

where, $\theta_i$ represents a current click-through rate threshold of an i-th piece of first-type display information $g_i$, and where i=1, 2, . . . , m, $\theta_i^{init}$ represents a preset initial click-through rate threshold of the piece of first-type display information $g_i$, $P_i^{ctr}$ and $I_i^{ctr}$ respectively represent a proportional parameter and an integral parameter based on which a PID adjustment is performed on a click-through rate threshold of the piece of first-type display information $g_i$, $C_i^{ctr}$ represents a product of a weighted $P_i^{ctr}$ multiplied with a weighted $I_i^{ctr}$, $n_i$ represents a predetermined display number of the piece of first-type display information $g_i$, $n_i'(t_j^l)$ represents a cumulative display number of the piece of first-type display information $g_i$ at a time instant $t_j^l$, $r(t_j^l)$ represents a target conversion rate of the piece of first-type display information $g_i$ at the time instant $t_j^l$, cdf( ) represents a click-through rate cumulative distribution function, clamp (x)=min $\{\max\{x, 10^{-6}\}, 10^6\}$, ppf( ) represents a click-through rate percentage function, and $\varepsilon_{ctr}$ and $u^{ctr}$ represent preset constants.

In an embodiment, the fourth determination submodule is configured to:

divide, for each display position, the current sub-time period equally into u sub-time intervals, and determine, for each of the multiple pieces of first-type display information, a proposed value of the piece of first-type display information in each of u sub-time intervals by using following equations, and use a proposed value of the piece of first-type display information in a current sub-time interval as the current proposed value of the piece of first-type display information:

$$P_i^{bid} \leftarrow \frac{B_i r(t_j^l) + \varepsilon_{bid}}{B_i'(t_j^l) + \varepsilon_{bid}}$$

-continued $$I_i^{bid} \leftarrow \text{clamp}\,(I_i^{bid} P_i^{bid})$$

$$C_i^{bid} \leftarrow P_i^{bid}(I_i^{bid})^{u_{bid}}$$

$$b_i \leftarrow C_i^{bid} b_i^{init}$$

where, $b_i$, represents a current proposed value of an i-th piece of first-type display information $g_i$, and where i=1, 2, . . . , m, $b_i^{init}$ represents a preset initial proposed value of the piece of first-type display information $g_i$, $P_i^{bid}$ and $I_i^{bid}$ respectively represent a proportional parameter and an integral parameter based on which a PID adjustment is performed on a proposed value of the piece of first-type display information $g_i$, $C_i^{bid}$ represents a product of a weighted $P_i^{bid}$ multiplied with a weighted $I_i^{bid}$, $B_i$ represents a maximum proposed value of the piece of first-type display information $g_i$, $B_i'(t_j^l)$ represents an actual value of the piece of first-type display information $g_i$ at a time instant $t_j^l$, $r(t_j^l)$ represents a target conversion rate of the piece of first-type display information $g_i$ at the time instant $t_j^l$, and $\varepsilon_{bid}$ and $u^{ctr}$ represent preset constants.

According to a third aspect of the present disclosure, a computer-readable storage medium is provided. The computer-readable storage medium stores computer program instructions. The computer program instructions, when executed by a processor, perform the method for displaying information flow according to the first aspect of the present disclosure.

According to a fourth aspect of the present disclosure, an electronic device is provided. The electronic device includes one or more processors and a memory. The memory stores one or more programs. The one or more programs, when executed by the one or more processors, cause the one or more processors to perform the method for displaying information flow according to the first aspect of the present disclosure.

With the above technical solutions, at least the following technical effects can be achieved. A predetermined display time period for the multiple pieces of first-type display information is divided into multiple sub-time periods; for each of the multiple sub-time periods, a segmented display target of each of the multiple pieces of first-type display information in the sub-time period is determined based on a display target of the piece of first-type display information in the predetermined display time period; and for each display position, target display information to be allocated to the display position is determined from the information flow, based on an estimated click-through rate of the display position, a proposed value of each of the multiple pieces of second-type display information, historical display data of each of the multiple pieces of first-type display information, and a segmented display target of each of the multiple pieces of first-type display information in a current sub-time period, so that an agreement according to which first-type display information included in an information flow is displayed can be satisfied, a click-through rate of the piece of first-type display information can be ensured, and a value loss can be reduced.

Other features and advantages of the present disclosure will be described in the following detailed embodiments.

DETAILED DESCRIPTION OF THE EMBODIMENTS

In order to make the objectives, technical solutions, and advantages of the embodiments of the present disclosure more clear, the technical solutions in the embodiments of the present disclosure will be described clearly and completely in conjunction with the drawings in the embodiments of the present disclosure. It is apparent that the described embodiments are only a few rather than all of the embodiments of the present disclosure. Any other embodiments obtained by those skilled in the art based on the embodiments of the present disclosure without any creative work fall in the protection scope of the present disclosure.

It should be noted that the terms "first" and "second" in the description, the claims, and the drawings of the present disclosure are used to distinguish similar objects, and should not be understood as indicating a specific order or sequence.

Figure 1:
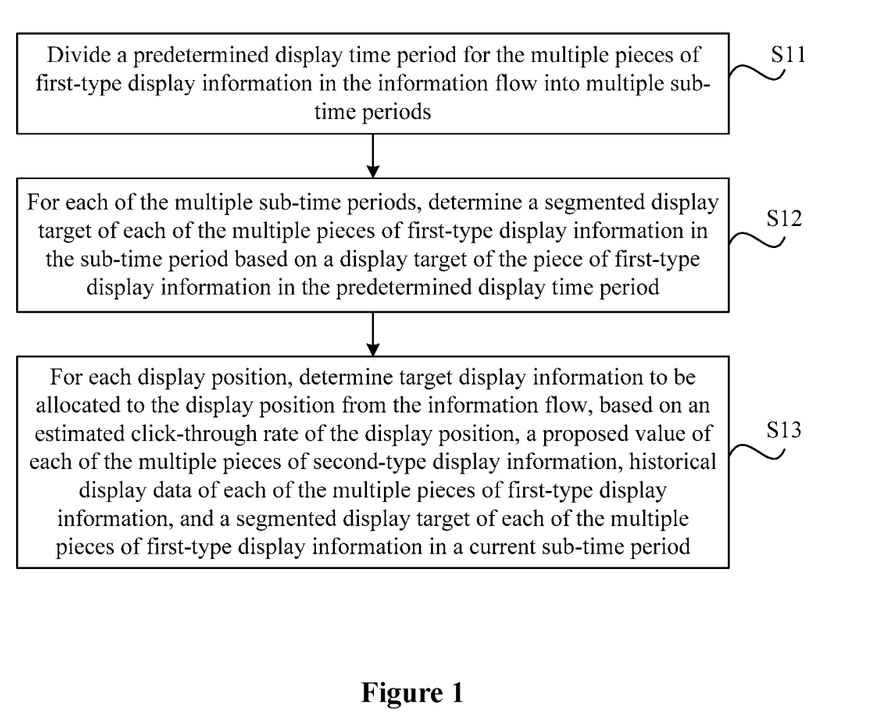
FIG. 1 is a flow chart of a method for displaying information flow according to an exemplary embodiment of the present disclosure.

FIG. 1 is a flow chart of a method for displaying information flow according to an exemplary embodiment of the present disclosure. As shown in FIG. 1, the method includes following steps S11 to S13.

In step S11, a predetermined display time period for multiple pieces of first-type display information in information flow is divided into multiple sub-time periods.

In step S12, for each of the multiple sub-time periods, a segmented display target of each of the multiple pieces of first-type display information in the sub-time period is determined based on a display target of the piece of first-type display information in the predetermined display time period.

In the embodiment of the present disclosure, the display target of each of the multiple pieces of first-type display information in the predetermined display time period may include a predetermined display number of the piece of first-type display information in the predetermined display time period. The segmented display target of the piece of first-type display information in each of the multiple sub-time periods may include a target display number of the piece of first-type display information in the sub-time period.

For example, it is assumed that the information flow includes m pieces of first-type display information, that is, $g_1, \ldots, g_m$. In a predetermined display time period $[t_{begin}, t_{end}]$, for any of the m pieces of first-type display information $g_i$, a predetermined display number of the piece of first-type display information $g_i$ in the predetermined display time period $[t_{begin}, t_{end}]$ is $n_i$, and a cumulative display number of the piece of first-type display information $g_i$ in the predetermined display time period $[t_{begin}, t_{end}]$ is $n_i'$, and thus a conversion rate of the piece of first-type display information $g_i$ is $\min\{n_i'/n_i, 1\}$. The predetermined display time period $[t_{begin}, t_{end}]$ is divided into multiple sub-time periods, that is, $[t_0, t_1], [t_1, t_2], \ldots, [t_{k-1}, t_k]$, where $t_0 = t_{begin}$ and $t_k = t_{end}$. Accordingly, a segmented display target of the piece of first-type display information $g_i$ in any of the multiple sub-time periods $[t_j, t_{j+1}]$ includes: A cumulative display number $n_i'(t_{j+1})$ of the piece of first-type display information $g_i$ at an ending time instant $t_{j+1}$ of the sub-time period $[t_j, t_{j+1}]$ should satisfy $n_i'(t_{j+1})=n_i r_i(t_{j+1})$, where $r_i(t_{j+1})$ is a target conversion rate of the piece of first-type display information $g_i$ at the ending time instant $t_{j+1}$.

In an implementation, in any sub-time period $[t_j, t_{j+1}]$, the selection of the target conversion rate $r_i(t_{j+1})$ may be considered as an action, thereby obtaining a set of actions A={0, 1, . . . , $\alpha_{max}$}, where $\alpha \in A$, and $\alpha_i$ represents an action performed in step i. State information $s(t_j)$ of each of the multiple pieces of first-type display information at a starting time instant $t_j$ of the sub-time period $[t_j, t_{j+1}]$ is obtained. The state information $s(t_j)$ includes: a cumulative display number $n_i'(t_j)$ and a cumulative click-through number $c_i(t_j)$ of each of the multiple pieces of first-type display information $g_i$ at the starting time instant $t_j$, and the starting time instant $t_j$. Then, the state information $s(t_j)$ is inputted into a segmented target determination model to obtain a total return for each action at the starting time instant $t_j$, and a value of an action which has a largest total return functions as a target conversion rate of each of the multiple pieces of first-type display information $g_i$ in the sub-time period $[t_j, t_{j+1}]$, that is, $r(t_{j+1})=\tau(\alpha, s(t_j))$. The segment target determination model is obtained by performing reinforcement learning based on historical state information of a large amount of first-type display information at the starting time instant $t_j$ and total returns corresponding to the historical state information.

It should be noted that a total return $R_j$ in any sub-time period $[t_j, t_{j+1}]$ can be represented by equations (1) to (3):

$$R_j = \lambda_1(T_1(t_{j+1}) - T_1(t_j)) + \lambda_2(T_2(t_{j+1}) - T_2(t_j)) + \lambda_3(T_3(t_{j+1}) - T_3(t_j)) \quad (1)$$

$$T_1(t) = \frac{\sum_{i=1}^{m} n_i \sigma(\min\{n_i'(t)/n_i, 1\})}{\sum_{i=1}^{m} n_i} \quad (2)$$

$$T_3(t) = \begin{cases} \dfrac{\sum_{i=1}^{m} c_i(t)}{\sum_{i=1}^{m} n_i'(t)} & \sum_{i=1}^{m} n_i'(t) > 0 \\ 0 & \text{other} \end{cases} \quad (3)$$

where, $T_1(t)$ represents a total conversion rate of all the pieces of first-type display information in the information flow at a time instant t; $T_2(t)$ represents a total value loss at the time instant t; $T_3(t)$ represents a total click-through rate of all the pieces of first-type display information at the time instant t; $n_i$ represents a predetermined display number of a piece of first-type display information $g_i$ in the predetermined display time period $[t_{begin}, t_{end}]$; $n_i'(t)$ represents a cumulative display number of the piece of first-type display information $g_i$ at the time instant t; $c_i(t)$ represents a cumulative click-through number of the piece of first-type display information $g_i$ at the time instant t, $\sigma:[0, 1] \rightarrow [0, 1]$; $\sigma$ represents an increasing convex function, $\sigma(0)=0$; and $\lambda_1$, $\lambda_2$, and $\lambda_3$ represent preset constants, and where since it is desirable to reduce the total value loss, $\lambda_2$ is negative.

It can be seen that, for each of the multiple sub-time periods, the value of the action which has a largest total return functions as the target conversion rate of each of the multiple pieces of first-type display information in the sub-time period, so that the total conversion rate $T_1$, the value loss $T_2$, and the total click-through rate $T_3$ of all the pieces of first-type display information in the sub-time period can be comprehensively optimized.

In step S13, for each display position, target display information to be allocated to the display position is determined from the information flow, based on an estimated click-through rate of the display position, a proposed value of each of the multiple pieces of second-type display information, historical display data of each of the multiple pieces of first-type display information, and a segmented display target of each of the multiple pieces of first-type display information in a current sub-time period.

The historical display data of each of the multiple pieces of first-type display information may include a cumulative display number and an actual value of the piece of first-type display information.

In an implementation, for each display position, if the display position is allocated to a piece of first-type of display information, a value loss is caused. In order to reduce the value loss, a proposed value may be set for each piece of first-type display information, and then the target display information to be allocated to the display position may be determined based on the proposed value of each piece of first-type display information and the proposed value of each of piece of second-type display information. Moreover, a higher display priority may be set for a piece of display information with a higher proposed value, so that the second-type display information with a higher proposed value has a higher display priority, thereby reducing the value loss. Specifically, for each of piece of first-type display information, a current proposed value of the piece of first-type display information may be determined based on a maximum proposed value of the piece of first-type display information, an actual value of the piece of first-type display information, the predetermined display number of the piece of first-type display information, and the target display number of the piece of first-type display information in the current sub-time period.

In addition, the display number of each of piece of first-type display information in each sub-time period is fixed. If a display position having a lower estimated click-through rate is allocated to first-type display information, the click-through rate of the first-type display information is affected. Therefore, in order to ensure a click-through rate of the first-type display information, it is required to set a click-through rate threshold for each piece of first-type display information. The target display information to be allocated to a current display position is determined by comprehensively considering the proposed value and the click-through rate threshold of each piece of first-type display information, the proposed value of each piece of second-type display information, and an estimated click-through rate of the current display position. Specifically, for each piece of first-type display information, a current click-through rate threshold of the first-type display information may be determined based on a cumulative display number of the first-type display information, a predetermined display number of the first-type display information, and a target display number of the first-type display information in a current sub-time period. Further, first-type display information having a current click-through rate threshold greater than the estimated click-through rate of the display position is filtered out from the multiple pieces of first-type display information, and a piece of display information having a highest current proposed value is selected from remaining pieces of first-type display information and the multiple pieces of second-type display information as the target display information to be allocated to the display position.

It should be noted that, in order to achieve the segmented display target of each of piece of first-type display information in each sub-time period, the proposed value and the click-through rate threshold of each piece of first-type display information can be adjusted in real time with PID control technology.

Specifically, any sub-time period $[t_j, t_{j+1}]$ may be divided equally into u sub-time intervals each of which has a length of $(t_{j+1}-t_j)/u$, that is, $[t^0_j, t^1_j]$, $[t^1_j, t^2_j]$, ..., $[t^{u-1}_j, t^u_j]$. A proposed value $b_i^{init}$ (that is, an initial proposed value) and a click-through rate threshold $\theta_i^{init}$ (that is, an initial click-through rate threshold) may be set for any of the first-type display information $g_i$ at a time instant $t^0_j$; and at an ending time instant of each sub-time interval (that is, time instants $t^1_j, t^2_j, \ldots, t^u_j$), a proposed value $b_i$ of the first-type display information $g_i$ is adjusted in real time by using equations (4) to (7), and a click-through rate threshold $C_i^{ctr}$ of the first-type display information $g_i$ is adjusted in real time by using equations (8) to (11). It can be seen that the proposed value $b_i$ and the click-through rate threshold $\theta_i^{init}$ of the first-type display information $g_i$ in each sub-time interval remain unchanged.

For each display position, a sub-time interval to which a current time instant belongs may be determined. For each piece of first-type display information, a proposed value $b_i$ of the piece of first-type display information in the sub-time interval functions as the current proposed value, and a click-through rate threshold $\theta_i^{init}$ of the piece of first-type display information in the sub-time interval functions as the current click-through rate threshold.

$$P_i^{bid} \leftarrow \frac{B_i r(t_j^l) + \varepsilon_{bid}}{B_i'(t_j^l) + \varepsilon_{bid}} \quad (4)$$

$$I_i^{bid} \leftarrow \text{clamp}(I_i^{bid} P_i^{bid}) \quad (5)$$

$$C_i^{bid} \leftarrow P_i^{bid}(I_i^{bid})^{u_{bid}} \quad (6)$$

$$b_i \leftarrow C_i^{bid} b_i^{init} \quad (7)$$

$$P_i^{ctr} \leftarrow \frac{n_i r(t_j^l) + \varepsilon_{ctr}}{n_i'(t_j^l) + \varepsilon_{ctr}} \quad (8)$$

$$I_i^{ctr} \leftarrow \text{clamp}(I_i^{ctr} P_i^{ctr}) \quad (9)$$

$$C_i^{ctr} \leftarrow P_i^{ctr}(I_i^{ctr})^{u_{ctr}} \quad (10)$$

$$\theta_i \leftarrow ppf(1 - C_i^{ctr}(1 - cdf(\theta_i^{init}))) \quad (11)$$

In which, $P_i^{bid}$ and $I_i^{bid}$ respectively represent a proportional parameter and an integral parameter based on which a PID adjustment is performed on a proposed value of an i-th piece of first-type display information $g_i$; $C_i^{bid}$ represents a product of a weighted $P_i^{bid}$ multiplied multiplied with a weighted $I_i^{bid}$; $P_i^{ctr}$ and $I_i^{ctr}$ respectively represent a proportional parameter and an integral parameter based on which a PID adjustment is performed on a click-through rate threshold of the piece of first-type display information $g_i$; $C_i^{ctr}$ represents a product of a weighted $P_i^{ctr}$ multiplied with a weighted $I_i^{ctr}$; $B_i$ represents a maximum proposed value of the piece of first-type display information $g_i$; $B_i'(t_j^l)$ represents an actual value of the piece of first-type display information $g_i$ at a time instant $t_j^l$; $r(t_j^l)$ represents a target conversion rate of the piece of first-type display information $g_i$ at a time instant $t_j^l$; $b_i^{init}$ represents a preset initial proposed value of the piece of first-type display information $g_i$; $n_i$ represents a predetermined display number of the piece $g_i$ of first-type display information $g_i$; $n_i'(t_j^l)$ represents a cumulative display number of the piece of first-type display information $g_i$ at a time instant $t_j^l$; $\theta_i^{init}$ represents a preset initial click-through rate threshold of the piece of first-type display information $g_i$; cdf( ) represents a click-through rate cumulative distribution function, and clamp(x)=min {max{x, $10^{-6}$}, $10^6$}; ppf( ) represents a click-through rate percentage function; and $\varepsilon_{bid}$, $\varepsilon_{ctr}$, $u^{bid}$, and $u^{ctr}$ represent preset constants, and $\varepsilon_{ctr}$=10, $\varepsilon_{bid}$=100, and $u^{bid}$=$u^{ctr}$=6.

With the method for displaying information flow according to the embodiments of the present disclosure, an agreement according to which the first-type display information is displayed can be satisfied, a click-through rate of the first-type display information can be ensured, and a value loss can be reduced.

Figure 2:
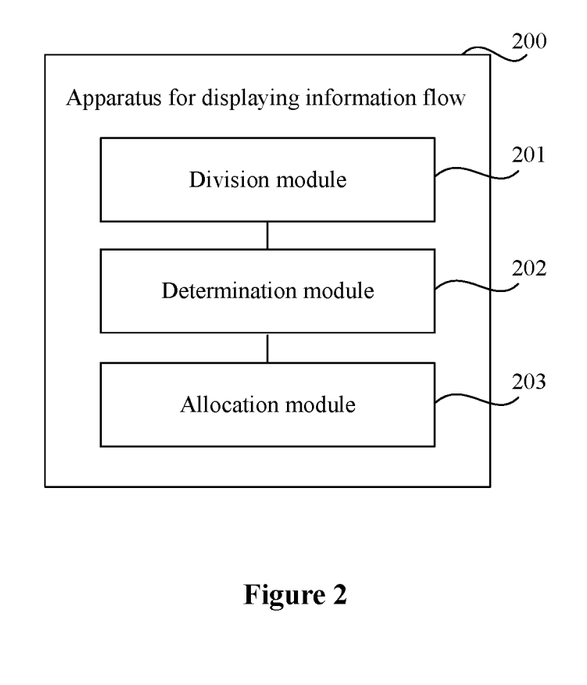
FIG. 2 is a block diagram of an apparatus for displaying information flow according to an exemplary embodiment of the present disclosure.

FIG. 2 is a block diagram of an apparatus for displaying information flow according to an exemplary embodiment of the present disclosure. As shown in FIG. 2, the apparatus 200 may include a division module 201, a determination module 202, and an allocation module 203.

The division module 201 is configured to divide a predetermined display time period for multiple pieces of first-type display information into multiple sub-time periods.

The determination module 202 is configured to determine, for each of the multiple sub-time periods, a segmented display target of each of the multiple pieces of first-type display information in the sub-time period based on a display target of the piece of first-type display information in the predetermined display time period.

The allocation module 203 is configured to determine, for each display position, target display information to be allocated to the display position from the information flow, based on an estimated click-through rate of the display position, a proposed value of each of the multiple pieces of second-type display information, historical display data of each of the multiple pieces of first-type display information, and a segmented display target of each of the multiple pieces of first-type display information in a current sub-time period.

In an embodiment, the display target includes a predetermined display number of each of the multiple pieces of first-type display information, and the segmented display target includes a target display number of each of the multiple pieces of first-type display information in each of the multiple sub-time periods.

Figure 3:
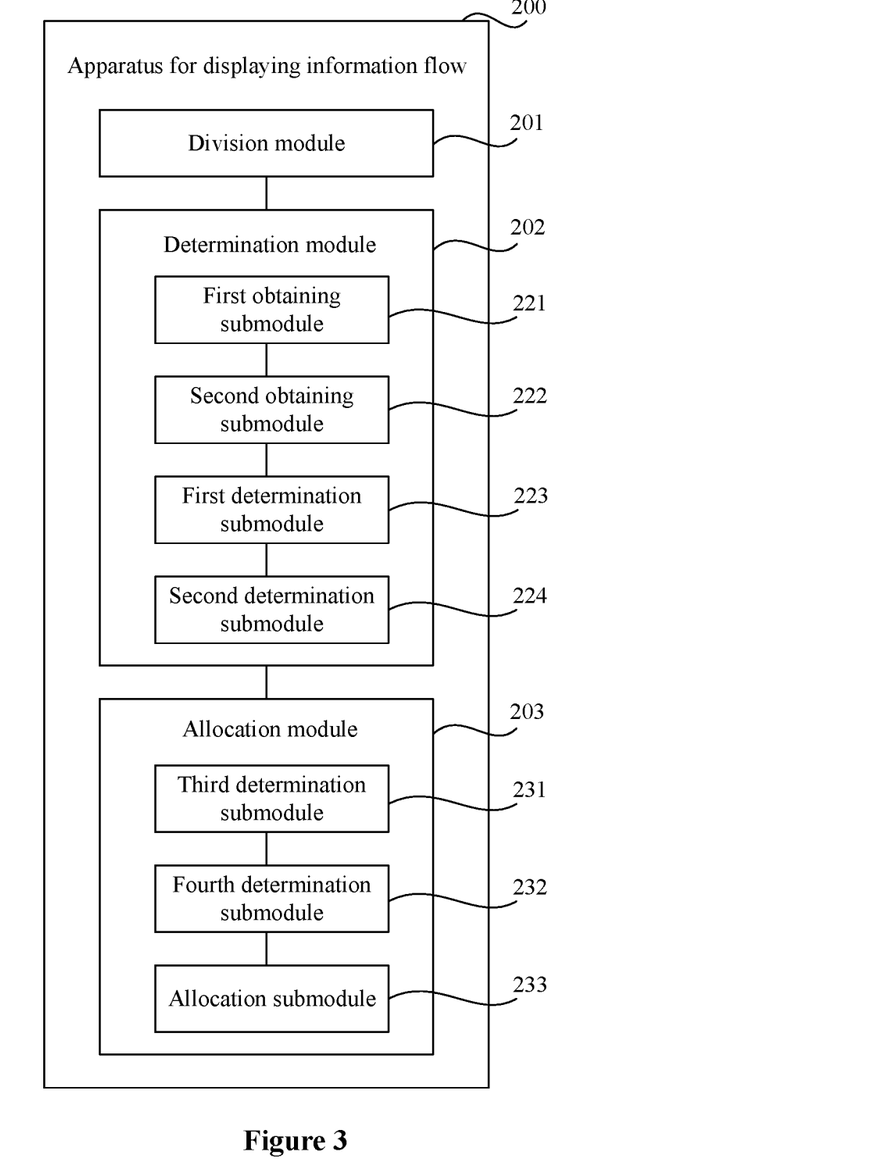
FIG. 3 is a block diagram of an apparatus for displaying information flow according to another exemplary embodiment of the present disclosure.

As shown in FIG. 3, the determination module 202 includes: a first obtaining submodule 221, a second obtaining submodule 222, a first determination submodule 223, and a second determination submodule 224.

The first obtaining submodule 221 is configured to obtain, for each of the multiple sub-time periods, a cumulative display number and a cumulative click-through number of each of the multiple pieces of first-type display information at a starting time instant of the sub-time period.

The second obtaining submodule 222 is configured to input the starting time instant, the cumulative display number and the cumulative click-through number of each of the multiple pieces of first-type display information at the starting time instant as state information into a segment target determination model, to obtain a total return which is outputted from the segment target determination model and corresponds to the state information. The segment target determination model is obtained by performing reinforcement learning based on historical state information of multiple pieces of first-type display information at the starting time instant and total returns corresponding to the historical state information.

The first determination submodule 223 is configured to determine a target conversion rate of each of the multiple pieces of first-type display information in the sub-time period based on the total return corresponding to the state information.

The second determination submodule 224 is configured to determine, for each of the multiple pieces of first-type display information, a target display number of the piece of first-type display information in the sub-time period based on a predetermined display number of the piece of first-type display information in the predetermined display time period and the target conversion rate of the piece of first-type display information in the sub-time period.

In an embodiment, the segmented display target includes a target display number of each piece of first-type display information in each sub-time period, and the historical displayed data includes a cumulative display number and an actual value of each piece of first-type display information.

As shown in FIG. 3, the allocation module 203 includes: a third determination submodule 231, a fourth determination submodule 232, and an allocation submodule 233.

The third determination submodule 231 is configured to determine, for each display position, a current click-through rate threshold of each of the multiple pieces of first-type display information based on a cumulative display number of the piece of first-type display information, a predetermined display number of the piece of first-type display information, and a target display number of the piece of first-type display information in a current sub-time period.

The fourth determination submodule 232 is configured to determine, for each display position, a current proposed value of each of the multiple pieces of first-type display information, based on a maximum proposed value of the piece of first-type display information, an actual value of the piece of first-type display information, the predetermined display number of the piece of first-type display information, and the target display number of the piece of first-type display information in the current sub-time period.

The allocation submodule 233 is configured to filter out first-type display information having a current click-through rate threshold greater than the estimated click-through rate of the display position from the multiple pieces of first-type display information, and select a piece of display information having a highest current proposed value from remaining pieces of first-type display information and the multiple pieces of second-type display information as the target display information.

In an embodiment, the third determination submodule 231 is configured to:
divide, for each display position, the current sub-time period equally into u sub-time intervals, and
determine, for each of the multiple pieces of first-type display information, a click-through rate threshold of the piece of first-type display information in each of u sub-time intervals by using following equations, and use a click-through rate threshold of the piece of first-type display information in a current sub-time interval as the current click-through rate threshold of the piece of first-type display information:

$$P_i^{ctr} \leftarrow \frac{n_i r(t_j^I) + \varepsilon_{ctr}}{n_i'(t_j^I) + \varepsilon_{ctr}}$$

$$I_i^{ctr} \leftarrow \text{clamp}(I_i^{ctr} P_i^{ctr})$$

$$C_i^{ctr} \leftarrow P_i^{ctr}(I_i^{ctr})^{u_{ctr}}$$

$$\theta_i \leftarrow ppf(1 - C_i^{ctr}(1 - cdf(\theta_i^{init})))$$

where, $\theta_i$ represents a current click-through rate threshold of an i-th piece of first-type display information $g_i$, and where i=1, 2, ..., m; $\theta_i^{init}$ represents a preset initial click-through rate threshold of the piece of first-type display information $g_i$; $P_i^{ctr}$ and $I_i^{ctr}$ respectively represent a proportional parameter and an integral parameter based on which a PID adjustment is performed on a click-through rate threshold of the piece of first-type display information $g_i$; $C_i^{ctr}$ represents a product of a weighted $P_i^{ctr}$ multiplied with a weighted $I_i^{ctr}$; $n_i$ represents a predetermined display number of the piece of first-type display information $g_i$; $n_i'(t_j^I)$ represents a cumulative display number of the piece of first-type display information $g_i$ at a time instant $t_j^I$; $r(t_j^I)$ represents a target conversion rate of the piece of first-type display information $g_i$ at a time instant $t_j^I$; cdf( ) represents a click-through rate cumulative distribution function, clamp $(x) = \min\{\max\{x, 10^{-6}\}, 10^6\}$; ppf( ) represents a click-through rate percentage function, and $\varepsilon_{ctr}$ and $u^{ctr}$ represent preset constants.

In an embodiment, the fourth determination submodule 232 is configured to:
divide, for each display position, the current sub-time period equally into u sub-time intervals; and
determine, for each of the multiple pieces of first-type display information, a proposed value of the piece of first-type display information in each of u sub-time intervals by using following equations, and use a proposed value of the piece of first-type display information in a current sub-time interval as the current proposed value of the piece of first-type display information:

$$P_i^{bid} \leftarrow \frac{B_i r(t_j^I) + \varepsilon_{bid}}{B_i'(t_j^I) + \varepsilon_{bid}}$$

$$I_i^{bid} \leftarrow \text{clamp}(I_i^{bid} P_i^{bid})$$

$$C_i^{bid} \leftarrow P_i^{bid}(I_i^{bid})^{u_{bid}}$$

$$b_i \leftarrow C_i^{bid} b_i^{init}$$

where, $b_i$ represents a current proposed value of an i-th piece of first-type display information $g_i$, and where i=1, 2, ..., m; $b_i^{init}$ represents a preset initial proposed value of the piece of first-type display information $g_i$; $P_i^{bid}$ and $I_i^{bid}$ respectively represent a proportional parameter and an integral parameter based on which a PID adjustment is performed on a proposed value of the piece of first-type display information $g_i$; $C_i^{bid}$ represents a product of a weighted $P_i^{bid}$ multiplied with a weighted $I_i^{bid}$; $B_i$ represents a maximum proposed value of the piece of first-type display information $g_i$; $B_i'(t_j^I)$ represents an actual value of the piece of first-type display information $g_i$ at a time instant $t_j^I$; $r(t_j^I)$ represents a target conversion rate of the piece of first-type display information $g_i$ at a time instant $t_j^I$, and $\varepsilon_{bid}$ and $u^{ctr}$ represent preset constants.

The specific operations performed by the modules in the apparatus in the embodiments have been described in detail in the method embodiments, which are not described herein again.

In addition, it can be clearly understood by those skilled in the art that, for convenience and conciseness of description, the division of the function modules described above is only schematic. In actual applications, the function described above can be achieved by different function modules based on actual needs, that is, the device can be divided into different functional modules to realize all or a part of the functions described above. For an operating process of the functional modules described above, one may refer to a process in the method embodiment described above. Details are not described herein again.

With the above apparatus for displaying information flow, an agreement according to which the first-type display information is displayed can be satisfied, a click-through rate of the first-type display information can be ensured, and a value loss can be reduced.

Figure 4:
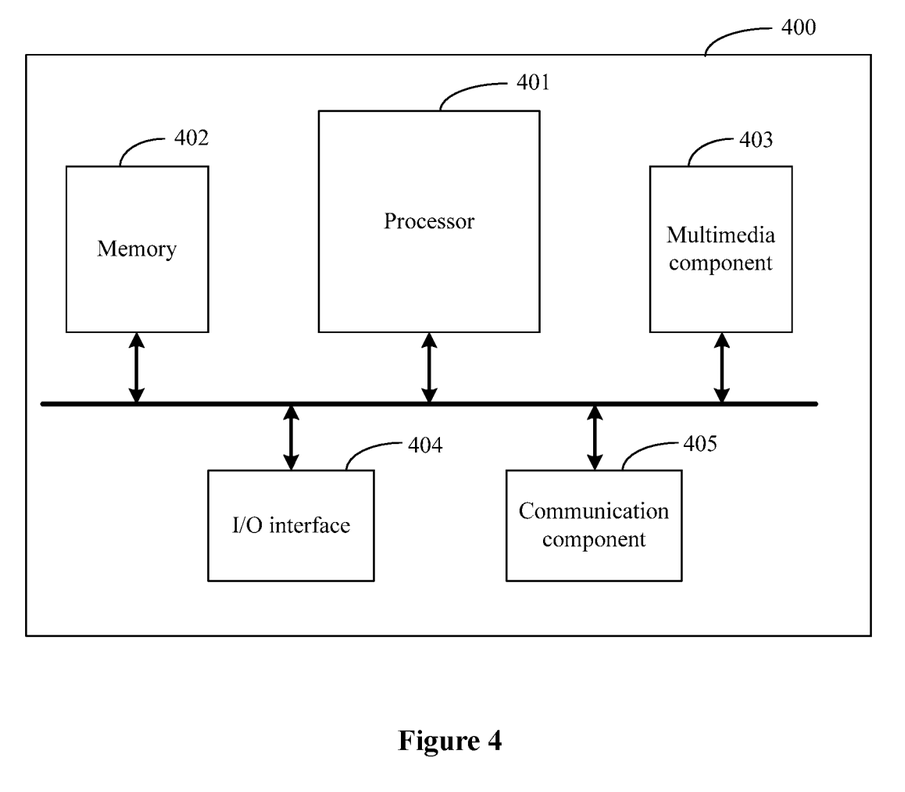
FIG. 4 is a block diagram of an electronic device according to an exemplary embodiment of the present disclosure.

FIG. 4 is a block diagram of an electronic device 400 according to an exemplary embodiment of the present disclosure. As shown in FIG. 4, the electronic device 400 may include: a processor 401 and a memory 402. The electronic device 400 may further include one or more of a multimedia component 403, an input/output (I/O) interface 404, and a communication component 405.

The processor 401 is configured to control the overall operation of the electronic device 400 to complete all or part of steps of the method for displaying information flow. The memory 402 is configured to store various types of data to support operations to be performed on the electronic device 400. The data may include, for example, instructions of any application program or method operated on the electronic device 400, and data related to the application program, such as contact data, messages sent and received, pictures, audio, and video. The memory 402 may be implemented as any type of volatile or non-volatile storage device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disk. The multimedia component 403 may include a screen and an audio component. The screen may be, for example, a touch screen, and the audio component is configured to output and/or input an audio signal. For example, the audio component may include a microphone for receiving an external audio signal, and the received audio signal may be stored in the memory 402 or be transmitted via the communication component 405. The audio component further includes at least one speaker for outputting an audio signal. The I/O interface 404 is configured to provide interfaces between the processor 401 and other interface modules. The other interface modules may include a keyboard, a mouse, a button, and so on. These buttons may be virtual buttons or physical buttons. The communication component 405 is configured to provide a wired or wireless communication between the electronic device 400 and other devices. The wireless communication is based on, for example, Wi-Fi, Bluetooth, Near Field Communication (NFC), 2G, 3G, 4G, or a combination of one or more of the above communication schemes. Therefore, the communication component 405 may include a Wi-Fi module, a Bluetooth module, and an NFC module.

In an embodiment, the electronic device 400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components, to perform the method for displaying information flow.

In another embodiment, a computer-readable storage medium storing program instructions is further provided. The program instructions, when executed by a processor, perform the method for displaying information flow. For example, the computer-readable storage medium may be implemented as the memory 402 storing program instructions, and the program instructions may be executed by the processor 401 of the electronic device 400 to perform the method for displaying information flow.

Preferred embodiments of the present disclosure are described above in detail with reference to the drawings. However, the present disclosure is not limited to the specific details of the embodiments. Within the scope of the technical concept of the present disclosure, various simple modifications can be made to the technical solution of the present disclosure. These simple modifications should fall into the protection scope of the present disclosure.

In addition, it should be noted that the specific technical features described in the above specific embodiments may be combined in any suitable manner without contradictions. In order to avoid unnecessary repetition, various possible combinations are not described in the present disclosure.

In addition, the embodiments of the present disclosure can also be combined arbitrarily. Without departing from the concept of the present disclosure, these combinations should also fall in the scope of the present disclosure.

The invention claimed is:

1. A method for displaying information flow, wherein the information flow comprises a plurality of pieces of first-type display information and a plurality of pieces of second-type display information, wherein the first-type display information is associated with a predetermined display time period of displaying the plurality of pieces of the first-type display information, and each of the plurality of pieces of the first-type display information corresponds to a predetermined number of displaying each piece in the predetermined display time period, wherein each piece of the second-type display information is associated with a value that is obtained by displaying the second-type display information, wherein displaying the first-type display information instead of the second-type display information causes a value loss, and wherein the method comprises:
dividing the predetermined display time period for the plurality of pieces of first-type display information into a plurality of sub-time periods;
determining, for each of the plurality of sub-time periods, a segmented display target of each of the plurality of pieces of the first-type display information in each sub-time period based on the predetermined number for displaying each of the plurality of pieces of the first-type display information in the predetermined display time period, wherein the segmented display target comprises a target number of displaying each of the plurality of pieces of the first-type display information in each of the plurality of sub-time periods; and
determining, for each display position, target display information to be allocated to the display position from the information flow, based on an estimated click-through rate of the display position, the value of each of the plurality of pieces of the second-type display information, historical display data of each of the plurality of pieces of the first-type display information, and the segmented display target of each of the plurality of pieces of the first-type display information in a current sub-time period.

2. The method according to claim 1, wherein the determining, for each of the plurality of sub-time periods, a segmented display target of each of the plurality of pieces of the first-type display information in the sub-time period based on the predetermined number for displaying each of the plurality of pieces of the first-type display information in the predetermined display time period further comprises:

obtaining, for each of the plurality of sub-time periods, a cumulative display number and a cumulative click-through number of each of the plurality of pieces of the first-type display information at a starting time of each sub-time period;

determining a total return of each piece of the first-type display information in each sub-time period using a segment target determination model based on state information associated with each sub-time period and each piece of the first-type display information, wherein the state information comprises the starting time of each sub-time period, the cumulative display number and the cumulative click-through number of each piece of the first-type display information at the starting time, and wherein the segment target determination model is pretrained by performing reinforcement learning using a large amount of historical first-type display information;

determining a target conversion rate of each of the plurality of pieces of the first-type display information in each sub-time period based on the total return; and determining, for each of the plurality of pieces of the first-type display information, the target number of displaying each piece of the first-type display information in each sub-time period based on the predetermined number of displaying each piece of the first-type display information in the predetermined display time period and the target conversion rate of each piece of the first-type display information in each sub-time period.

3. The method according to claim 1, wherein the determining, for each display position, target display information to be allocated to the display position from the information flow, based on an estimated click-through rate of the display position, the value of each of the plurality of pieces of the second-type display information, historical display data of each of the plurality of pieces of the first-type display information, and the segmented display target of each of the plurality of pieces of the first-type display information in a current sub-time period further comprises:

determining, for each display position, a current click-through rate threshold and a current value of each of the plurality of pieces of the first-type display information based at least in part on a target number of displaying each piece of the first-type display information in the current sub-time period; and determining the target display information to be allocated to the display position based on the current click-through rate threshold and the current value of each of the plurality of pieces of the first-type display information, the estimated click-through rate of the display position, and the value of each of the plurality of pieces of the second-type display information.

4. The method according to claim 3, wherein the current click-through rate threshold of each of the plurality of pieces of the first-type display information in the current sub-time period is determined by:

dividing, for each display position, the current sub-time period equally into u sub-time intervals;

determining, for each of the plurality of pieces of the first-type display information, a click-through rate threshold of each piece of the first-type display information in each of u sub-time intervals using following equations:

$$P_i^{ctr} \leftarrow \frac{n_i r(t_j^l) + \varepsilon_{ctr}}{n_i'(t_j^l) + \varepsilon_{ctr}}$$

$$I_i^{ctr} \leftarrow \text{clamp}(I_i^{ctr} P_i^{ctr})$$

$$C_i^{ctr} \leftarrow P_i^{ctr}(I_i^{ctr})^{u_{ctr}}$$

$$\theta_i \leftarrow ppf(1 - C_i^{ctr}(1 - cdf(\theta_i^{init})))$$

where, $\theta_i$, represents a current click-through rate threshold of an i-th piece of the first-type display information $g_i$, and i=1, 2, ..., m, $\theta_i^{init}$ represents a preset initial click-through rate threshold of the piece of the first-type display information $g_i$, $P_i^{ctr}$ and $I_i^{ctr}$ respectively represent a proportional parameter and an integral parameter based on which a PID adjustment is performed on a click-through rate threshold of the piece of first-type display information $g_i$, $C_i^{ctr}$ represents a product of a weighted $P_i^{ctr}$ multiplied with a weighted $I_i^{ctr}$, $n_i$ represents a predetermined display number of the piece of first-type display information $g_i$, $n_i'(t_j^l)$ represents a cumulative display number of the piece of first-type display information $g_i$ at a time instant $t_j^l$, $r(t_j^l)$ represents a target conversion rate of the piece of first-type display information $g_i$ at a time instant $t_j^l$, cdf( ) represents a click-through rate cumulative distribution function, clamp(x)=min{max{x,10$^{-6}$},10$^6$}, ppf( ) represents a click-through rate percentage function, and $\varepsilon_{ctr}$ and $u^{ctr}$ represent preset constants; and identifying a click-through rate threshold of each piece of the first-type display information in a current sub-time interval as the current click-through rate threshold of each piece of the first-type display information in the current sub-time period.

5. The method according to claim 3, wherein the current value of each of the plurality of pieces of the first-type display information in the current sub-time period is determined by:

dividing, for each display position, the current sub-time period equally into u sub-time intervals;

determining, for each of the plurality of pieces of the first-type display information, a current value of each piece of the first-type display information in each of u sub-time intervals using following equations:

$$P_i^{bid} \leftarrow \frac{B_i r(t_j^l) + \varepsilon_{bid}}{B_i'(t_j^l) + \varepsilon_{bid}}$$

$$I_i^{bid} \leftarrow \text{clamp}(I_i^{bid} P_i^{bid})$$

$$C_i^{bid} \leftarrow P_i^{bid}(I_i^{bid})^{u_{bid}}$$

$$b_i \leftarrow C_i^{bid} b_i^{init}$$

where, $b_i$ represents a current proposed value of an i-th piece of the first-type display information $g_i$, and where i=1, 2, ..., m, $b_i^{init}$ represents a preset initial proposed value of the piece of first-type display information $g_i$, $P_i^{bid}$ and $I_i^{bid}$ respectively represent a proportional parameter and an integral parameter based on which a PID adjustment is performed on a proposed value of the piece of first-type display information $g_i$, $C_i^{bid}$ represents a product of a weighted $P_i^{bid}$ multiplied with a weighted $I_i^{bid}$, $B_i$ represents a maximum proposed value of the piece of first-type display information $g_i$, $B_i'(t_j^l)$ represents an actual value of the piece of first-type display information $g_i$ at a time instant $t_j^l$, $r(t_j^l)$ represents a target conversion rate of the piece of first-type display information $g_i$ at a time instant $t^t_j$, and $\varepsilon_{bid}$ and $u^{ctr}$ represent preset constants; and identifying a value of each piece of the first-type display information in a current sub-time interval as the current value of each piece of the first-type display information in the current sub-time period.

6. An apparatus for displaying information flow, wherein the information flow comprises a plurality of pieces of first-type display information and a plurality of pieces of second-type display information, wherein the first-type display information is associated with a predetermined display time period of displaying the plurality of pieces of the first-type display information, and each of the plurality of pieces of the first-type display information corresponds to a predetermined number of displaying each piece in the predetermined display time period, wherein each piece of the second-type display information is associated with a value that is obtained by displaying the second-type display information, wherein displaying the first-type display information instead of the second-type display information causes a value loss, and wherein the apparatus comprises:

one or more processors, and
a memory,
wherein the memory stores one or more programs, and the one or more programs, when executed by the one or more processors, cause the one or more processors to:

divide the predetermined display time period for the plurality of pieces of first-type display information into a plurality of sub-time periods;

determine, for each of the plurality of sub-time periods, a segmented display target of each of the plurality of pieces of the first-type display information in each sub-time period based on the predetermined number for displaying each of the plurality of pieces of the first-type display information in the predetermined display time period, wherein the segmented display target comprises a target number of displaying each of the plurality of pieces of the first-type display information in each of the plurality of sub-time periods; and determine, for each display position, target display information to be allocated to the display position from the information flow, based on an estimated click-through rate of the display position, the value of each of the plurality of pieces of the second-type display information, historical display data of each of the plurality of pieces of the first-type display information, and the segmented display target of each of the plurality of pieces of the first-type display information in a current sub-time period.

7. The apparatus according to claim 6, wherein the memory stores one or more programs, and the one or more programs, when executed by the one or more processors, cause the one or more processors to:

obtain, for each of the plurality of sub-time periods, a cumulative display number and a cumulative click-through number of each of the plurality of pieces of the first-type display information at a starting time of each sub-time period;

determine a total return of each piece of the first-type display information in each sub-time period using a segment target determination model based on state information associated with each sub-time period and each piece of the first-type display information, wherein the state information comprises the starting time of each sub-time period, the cumulative display number and the cumulative click-through number of each piece of the first-type display information at the starting time, and wherein the segment target determination model is pretrained by performing reinforcement learning using a large amount of historical first-type display information;

determine a target conversion rate of each of the plurality of pieces of the first-type display information in each sub-time period based on the total return; and determine, for each of the plurality of pieces of the first-type display information, the target number of displaying each piece of the first-type display information in each sub-time period based on the predetermined number of displaying each piece of the first-type display information in the predetermined display time period and the target conversion rate of each piece of the first-type display information in each sub-time period.

8. The apparatus according to claim 6, wherein the memory stores one or more programs, and the one or more programs, when executed by the one or more processors, cause the one or more processors to:

determine, for each display position, a current click-through rate threshold and a current value of each of the plurality of pieces of the first-type display information based at least in part on a target number of displaying each piece of the first-type display information in the current sub-time period; and determine the target display information to be allocated to the display position based on the current click-through rate threshold and the current value of each of the plurality of pieces of the first-type display information, the estimated click-through rate of the display position, and the value of each of the plurality of pieces of the second-type display information.

9. The apparatus according to claim 8, wherein the current click-through rate threshold of each of the plurality of pieces of the first-type display information in the current sub-time period is determined by:

dividing, for each display position, the current sub-time period equally into u sub-time intervals;

determining, for each of the plurality of pieces of the first-type display information, a click-through rate threshold of each piece of the first-type display information in each of u sub-time intervals using following equations:

$$P_i^{ctr} \leftarrow \frac{n_i r(t_j^I) + \varepsilon_{ctr}}{n_i'(t_j^I) + \varepsilon_{ctr}}$$

$$I_i^{ctr} \leftarrow \text{clamp } (I_i^{ctr} P_i^{ctr})$$

$$C_i^{ctr} \leftarrow P_i^{ctr}(I_i^{ctr})^{u_{ctr}}$$

$$\theta_i \leftarrow ppf(1 - C_i^{ctr}(1 - cdf(\theta_i^{init})))$$

where, $\theta_i$ represents a current click-through rate threshold of an i-th piece of the first-type display information $g_i$, and i=1, 2, ..., m, $\theta_i^{init}$ represents a preset initial click-through rate threshold of the piece of first-type display information $g_i$, $P_i^{ctr}$ and $I_i^{ctr}$ respectively represent a proportional parameter and an integral parameter based on which a PID adjustment is performed on a click-through rate threshold of the piece of first-type display information $g_i$, $C_i^{ctr}$ represents a product of a weighted $P_i^{ctr}$ multiplied with a weighted $I_i^{ctr}$, $n_i$ represents a predetermined display number of the piece of first-type display information $g_i$, $n_i'(t_j^I)$ represents a cumulative display number of the piece of first-type display information $g_i$ at a time instant $t^I_j$, $r(t^I_j)$ represents a target conversion rate of the piece of first-type display information $g_i$ at a time instant $t^I_j$, cdf( ) represents a click-through rate cumulative distribution function, clamp(x)=min{max{x,$10^{-6}$}, $10^6$}, ppf( ) represents a click-through rate percentage function, and $\varepsilon_{ctr}$ and $u^{ctr}$ represent preset constants; and identifying a click-through rate threshold of each piece of the first-type display information in a current sub-time interval as the current click-through rate threshold of each piece of the first-type display information in the current sub-time period.

10. The apparatus according to claim 8, wherein the current value of each of the plurality of pieces of the first-type display information in the current sub-time period is determined by:

dividing, for each display position, the current sub-time period equally into u sub-time intervals;
  determining, for each of the plurality of pieces of the first-type display information, a current value of each piece of the first-type display information in each of u sub-time intervals using following equations:

$$P^{bid}_i \leftarrow \frac{B_i r(t^I_j) + \varepsilon_{bid}}{B'_i(t^I_j) + \varepsilon_{bid}}$$

$$I^{bid}_i \leftarrow \text{clamp}(I^{bid}_i P^{bid}_i)$$

$$C^{bid}_i \leftarrow P^{bid}_i (I^{bid}_i)^{u_{bid}}$$

$$b_1 \leftarrow C^{bid}_i b^{init}_i$$

where, $b_i$ represents a current proposed value of an i-th piece of the first-type display information $g_i$, and where i=1, 2, ..., m, $b^{init}_i$ represents a preset initial proposed value of the piece of first-type display information $g_i$, $I^{bid}_i$ respectively represent a proportional parameter and an integral parameter based on which a PID adjustment is performed on a proposed value of the piece of first-type display information $g_i$, $C^{bid}_i$ represents a product of a weighted $P^{bid}_i$ multiplied with a weighted $I^{bid}_i$, $B_i$ represents a maximum proposed value of the piece of first-type display information $g_i$, $B'_i(t^I_j)$ represents an actual value of the piece of first-type display information $g_i$ at a time instant $t^I_j$, $r(t^I_j)$ represents a target conversion rate of the piece of first-type display information $g_i$ at a time instant $t^I_j$, and $\varepsilon_{bid}$ and $u^{ctr}$ represent preset constants; and identifying a value of each piece of the first-type display information in a current sub-time interval as the current value of each piece of the first-type display information in the current sub-time period.

11. A non-transitory computer-readable storage medium storing a computer program, wherein the computer program, when executed by a processor, performs operations for displaying information flow, wherein the information flow comprises a plurality of pieces of first-type display information and a plurality of pieces of second-type display information, wherein the first-type display information is associated with a predetermined display time period of displaying the plurality of pieces of the first-type display information, and each of the plurality of pieces of the first-type display information corresponds to a predetermined number of displaying each piece in the predetermined display time period, wherein each piece of the second-type display information is associated with a value that is obtained by displaying the second-type display information, wherein displaying the first-type display information instead of the second-type display information causes a value loss, and wherein the operations comprise:

dividing the predetermined display time period for the plurality of pieces of first-type display information into a plurality of sub-time periods;
  determining, for each of the plurality of sub-time periods, a segmented display target of each of the plurality of pieces of the first-type display information in each sub-time period based on the predetermined number for displaying each of the plurality of pieces of the first-type display information in the predetermined display time period, wherein the segmented display target comprises a target number of displaying each of the plurality of pieces of the first-type display information in each of the plurality of sub-time periods; and
  determining, for each display position, target display information to be allocated to the display position from the information flow, based on an estimated click-through rate of the display position, the value of each of the plurality of pieces of the second-type display information, historical display data of each of the plurality of pieces of the first-type display information, and the segmented display target of each of the plurality of pieces of the first-type display information in a current sub-time period.

12. The non-transitory computer-readable storage medium of claim 11, the operations further comprising:

obtaining, for each of the plurality of sub-time periods, a cumulative display number and a cumulative click-through number of each of the plurality of pieces of the first-type display information at a starting time of each sub-time period;
  determining a total return of each piece of the first-type display information in each sub-time period using a segment target determination model based on state information associated with each sub-time period and each piece of the first-type display information, wherein the state information comprises the starting time of each sub-time period, the cumulative display number and the cumulative click-through number of each piece of the first-type display information at the starting time, and wherein the segment target determination model is pretrained by performing reinforcement learning using a large amount of historical first-type display information;
  determining a target conversion rate of each of the plurality of pieces of the first-type display information in each sub-time period based on the total return; and
  determining, for each of the plurality of pieces of the first-type display information, the target number of displaying each piece of the first-type display information in each sub-time period based on the predetermined number of displaying each piece of the first-type display information in the predetermined display time period and the target conversion rate of each piece of the first-type display information in each sub-time period.

13. The non-transitory computer-readable storage medium of claim 11, the operations further comprising:

determining, for each display position, a current click-through rate threshold and a current value of each of the plurality of pieces of the first-type display information based at least in part on a target number of displaying each piece of the first-type display information in the current sub-time period; and determining the target display information to be allocated to the display position based on the current click-through rate threshold and the current value of each of the plurality of pieces of the first-type display information, the estimated click-through rate of the display position, and the value of each of the plurality of pieces of the second-type display information.

\* \* \* \* \*